No. 886,385. PATENTED MAY 5, 1908.
J. G. MASTIN.
CHEMICAL FIRE PAIL.
APPLICATION FILED JULY 18, 1907.

Inventor
James G. Mastin

By Dudley, Browne & Phelps,
Attorneys

Witnesses

UNITED STATES PATENT OFFICE.

JAMES G. MASTIN, OF CHICAGO, ILLINOIS.

CHEMICAL FIRE-PAIL.

No. 886,385.

Specification of Letters Patent.

Patented May 5, 1908.

Application filed July 18, 1907. Serial No. 384,352.

*To all whom it may concern:*

Be it known that I, JAMES G. MASTIN, a citizen of the United States, residing at Chicago, in the county of Cook and State of Illinois, have invented certain new and useful Improvements in Chemical Fire-Pails, of which the following is a specification.

My invention relates to certain new and useful improvements in portable fire extinguishers, and the object of my invention is to produce a device of simple and inexpensive construction, and composed of but few parts which can be connected to any pail of ordinary construction and which is adapted to contain chemicals.

With these objects in view, my invention consists in certain forms, constructions and arrangements of parts, the preferred form of which will be first described in connection with the accompanying drawings and then the invention fully pointed out in the claims.

Referring to the drawings wherein I show the preferred form of my invention and wherein the same part is designated by the same reference numeral wherever it occurs, Figure 1 is a perspective view of a pail having my invention secured thereto; Fig. 2 is a longitudinal section of my device showing the same closed; Fig. 3 is a similar view showing the same when open.

1 designates the pail constructed of any desired material and of any desired form; 2 designates the bail which is shown as pivotally secured to the pail at 3.

4 designates a cone-shaped container closed at its small end and open at its large end. This container at its open end is preferably formed with a bead 5 in which are secured a pair of wires 6.

7 designates a pair of wires soldered or otherwise secured to the small end of the cone.

8 designates a rod slidably secured on one side of the cone by means of the ears 9.

10 is a handle secured to the end of the rod projecting beyond the small end of the cone.

11 is a spring which I preferably mount between the ear 9 at the end of the cone and the handle to hold the same in the position shown in Fig. 2. This handle is adapted to extend above the bail of the pail as best shown in Fig. 1.

12 designates a cover which is of the form best shown in Fig. 3 which, as will be seen, has a centrally depressed portion 13 and an outwardly projecting flange 14, the centrally depressed portion 13 being of a size to closely fit within the large open end of the cone.

15 designates a ring which passes through an opening 16 in the outer edge of the cone, and a similar opening 17 in the rim of the cover. This ring acts as a hinge and prevents the cover from dropping when the device is operated. In the side of the cover opposite the hinge I provide a projection 18, which is adapted to project up in line with the rod 8 on the cone, and 19 is a projection on the depressed portion of the cover, and is adapted to engage a depression 20 formed in the cone adjacent to its outer edge.

The parts being constructed as above described the device is secured in position on a pail by the wires 6 being connected to the bail adjacent to its hinge portion and the wires 7 secured to the bail at its middle portion. It will thus be seen that the device is supported in position on the pail with the handle 10 projecting above the bail. The cone being filled with chemicals and the pail with water, if it is desired to operate the device to extinguish a fire, the handle 10 is pressed against the bail which action forces the rod 8 against the projecting lip 18, pushing the cover out of the end of the cone, and thus releasing the chemicals contained therein. It will be noted that the pail can be readily lifted and carried by the bail without releasing the chemicals, by simply picking up the pail in the ordinary manner but not depressing the handle 10. The handle 10 can be depressed by the hand used by the person in lifting or carrying the pail, thus causing the cover 12 to be forced from its seat and the chemicals in the container drop into the pail.

While I have described what I believe to be the preferred form of my invention, I desire to have it understood that many changes can be made in the form, construction and arrangement of parts without departing from the spirit thereof.

Having thus described my invention what I claim as new and desire to secure by Letters Patent is

1. The combination with a pail having a bail, of a chemical container attached to the bail and in such relation thereto as to permit of the discharge of its contents by the hand used in lifting or carrying the pail.

2. The combination with a pail having a bail, of a chemical container secured to the bail of said pail, means for confining the chemicals within said container and means for releasing said chemicals therefrom said releasing means being so located with reference to the bail as to be operated by the hand grasping the bail in lifting or carrying the pail.

3. The combination with a pail having a bail, of a chemical container, and means secured adjacent to each end of said container and adapted to secure the container to the bail.

4. The combination with a pail having a bail, of a chemical container closed at one end and having a cover seated in the other end to close the same, means on the container whereby the cover can be forced from its seat, and means also carried by the container for securing the same to the bail.

5. The combination with a pail having a bail, of a container secured to the bail and closed at one end and having a cover seated in the other end to close the same, of a rod mounted on the container and adapted to be moved longitudinally thereof, one end of said rod terminating adjacent to said cover, and a handle mounted on the rod adjacent to the bail whereby the rod may be moved to force the cover from its seat.

In testimony whereof I affix my signature in presence of two witnesses.

JAMES G. MASTIN.

Witnesses:
DAVID A. RUSSELL,
H. M. WHEELER.